3,567,375
PHOSPHORIC ACID MANUFACTURE FROM GYPSUM AND PHOSPHATE ROCK

William A. Satterwhite, Lakeland, and Fred J. Klem, Brandon, Fla., assignors to United States Steel Corporation, Pittsburgh, Pa.
No Drawing. Filed June 26, 1968, Ser. No. 740,079
Int. Cl. C01b 25/18
U.S. Cl. 23—165                                10 Claims

ABSTRACT OF THE DISCLOSURE

Phosphate rock is digested with sulfuric acid to produce phosphoric acid and calcium sulfate. An alkali metal sulfate, such as potassium or sodium sulfate, is reacted with fluosilicic acid to produce sulfuric acid and the potassium or sodium silicofluoride, the sulfuric acid being recycled to the digestion step. The silicofluoride is calcined with silicon oxide to produce the potassium or sodium silicate and silicon tetrafluoride. The calcium sulfate from the digestion step together with the potassium or sodium silicate are calcined to produce the potassium or sodium sulfate and calcium silicate. Water is added to the silicon tetrafluoride to produce fluosilicic acid, and the potassium or sodium sulfate and the fluosilicic acid are recycled to the reaction step described above for producing the sulfuric acid.

BACKGROUND AND SUMMARY

The use of sulfuric acid in digesting phosphate rock to obtain phosphoric acid is desired for many reasons, but because of the shortage of sulfuric acid and its increasing cost, workers in the field have been seeking for many years to find processes for meeting this problem. Other acids have been employed with less success and less satisfactory products have been produced.

We have discovered that it is possible to prepare sulfuric acid utilizing the calcium sulfate produced in the sulfuric acid digestion process together with other reactants so that the sulfuric acid can be recycled to the digestion step and withdrawing as a by-product calcium silicate. In the process which utilizes cyclic reactants, two key components for phosphoric acid manufacture, namely, $H^+$ ion and $SO_4^=$ ion, are prepared.

DETAILED DESCRIPTION

Our new process is illustrated by the following equations:

1. $Ca_3(PO_4)_2 + 3H_2SO_4 + 2H_2O \longrightarrow 3CaSO_4 \cdot 2H_2O \downarrow + 2H_3PO_4$
2. $3K_2SO_4 + 3H_2SiF_6 \longrightarrow 3K_2SiF_6 \downarrow + 3H_2SO_4$
3. $3K_2SiF_6 + 1\tfrac{1}{2}SiO_2 \xrightarrow{\text{Calcine}} 3K_2SiO_3 + 4\tfrac{1}{2}SiF_4 \uparrow$
4. $3K_2SiO_3 + 3CaSO_4 \cdot 2H_2O \xrightarrow{\text{Calcine}} 3K_2SO_4 + 3CaSiO_3 \downarrow + 2H_2O$
5. $4\tfrac{1}{2}SiF_4 + H_2O \longrightarrow 3H_2SiF_6 + 1\tfrac{1}{2}SiO_2 \downarrow$ In the above process, step 1 represents the usual or conventional sulfuric acid digestion process which produces phosphoric acid and calcium sulfate.

Steps 4 and 5 produce the reactants for step 2 which form the $H_2SO_4$. Step 3 releases the fluoride for $SiF_4$ evolution and subsequent recovery and formation of $H_2SiF_6$. Thus the $H^+$ in step 5 and the $SO_4^=$ in step 4 are provided to effect the manufacture of phosphoric acid via $H_2SO_4$ in step 1. Heat is required in steps 3 and 4 and in a sense is the only raw material required. The process is cyclic with regard to fluoride and potassium. Calcium silicate rather than gypsum becomes the by-product.

The temperatures of calcining in steps 3 and 4 may be varied to bring about the reactions indicated. Usually temperatures of about 1800–1900° F. are sufficient for this purpose, but higher and lower temperatures may be used.

While in the illustrative equations set out above, we have shown potassium, it will be understood that sodium or any other alkali metal which forms an insoluble silicofluoride may be used as the cyclic metal.

If desired, steps 3 and 4 may be combined so as to employ one calcining step. However, we prefer to employ the separate steps so as to bring about complete evolution of fluorine. By separately decomposing the $K_2SiF_6$, we can maintain a very strong $SiF_4$ gas evolution. Since the $K_2SiO_3$ is a low viscosity melt at about 1800° F., we prefer to employ an electric resistance furnace for such heating to avoid combustion gases which might dilute the $SiF_4$ with $H_2O$, $CO_2$, $N_2$, etc. if steps 3 and 4 were combined. Since the calcination charge in step 4 is solid, we prefer to treat it in a rotary kiln or similar equipment which may employ hot combustion gases as the heat source.

Specific examples illustrative of the invention may be set out as follows:

EXAMPLE I

Phosphate rock was digested with sulfuric acid as described in Equation 1 resulting in the preparation of phosphoric acid and calcium sulfate, the calcium sulfate being separated by filtration. Recycled potassium sulfate was combined with recycled fluosilicic acid producing potassium silicofluoride and sulfuric acid, the sulfuric acid being recycled to the digestion step. Silicofluoride was separated and added to silicon oxide and the mixture calcined at 1800° F. to produce silicon tetrafluoride and potassium silicate. In this step, the following quantities of $K_2SiF_6$ and $SiO_2$ or flotation tailings (90% $SiO_2$) were mixed and calcined in a muffle furnace at 1800° F. Completion of the reaction is reflected by the percent F. remaining in the $K_2SiO_3$ residue.

| Run No. | $K_2SiF_6$ Wt. gms. | $K_2SiF_6$ Percent F | $SiO_2$, wt. gms. | Calcination time, hrs. | $K_2SiO_3$ residue, percent F |
|---|---|---|---|---|---|
| 12168 | 17.75 | 52.0 | 13.1 | 1 | 7.80 |
| 12868 | 17.75 | 52.0 | 14.5 | 3 | 4.20 |
| 22868 | 17.75 | 52.0 | 19.0 | 3 | 0.45 |
| 121568 | 17.75 | 52.0 | 19.0 | 3 | 0.65 |

The above indicates that an excess of silicon oxide above stoichiometric is desired to carry the reaction to completion. Better than 98 percent of the fluorine was evolved.

With respect to step 4 in which the potassium silicate is calcined with the calcium sulfate from the digestion step, the following runs were performed to effect a double decomposition of $CaSO_4 \cdot 2H_2O$ and $K_2SiO_3$ residue. The mixtures were calcined at 1800–1900° F. for ½ to 2 hours.

| Run No. | $K_2SiO_3$, gms. | $CaSO_4 \cdot 2H_2O$ wet basis, gms. | Time, hrs. | Temp., °F. | Calcine product | | |
|---|---|---|---|---|---|---|---|
| | | | | | $SO_4$ total, percent | $SO_4$ $H_2O$ sol., percent | $SO_4$ conversion, percent |
| 12156S | 5 | 4.5 | ½ | 1,800 | 23.66 | 22.84 | 96.4 |
| 12568 | 5 | 5.9 | 1 | 1,900 | 25.85 | 24.75 | 95.8 |
| 42868 | 5 | 7.2 | ½ | 1,800 | 30.05 | 28.45 | 94.7 |
| 32868 | 5 | 7.2 | 2 | 1,900 | 29.20 | 28.35 | 97.2 |

The insoluble calcium sulfate ($CaSO_4 \cdot 2H_2O$, which was the starting material) was decomposed to produce potassium sulfate in an extractable form which was then dissolved in water, leaving the calcium silicate undissolved. The calcium silicate was filtered out and discarded. The potassium sulfate was recycled to step 2.

In step 5, the silicon tetrafluoride was mixed with water to form fluosilicic acid, and the fluosilicic acid was recycled also to step 2 for reaction with the potassium sulfate in the preparation of sulfuric acid.

In the above operation it is found that additional fluorine enters the system in the phosphate rock and may be recovered by absorbing a side stream of $SiF_4$ in step 5.

EXAMPLE II

A process procedure as described in Example I is employed using sodium instead of potassium in steps 2, 3 and 4 and with comparable results.

While in the foregoing specification we have set out specific steps in considerable detail for the purpose of illustrating embodiments of our invention, it will be understood that such details may be varied widely by those skilled in the art without departing from the spirit of our invention.

What is claimed is:

1. In a process for the preparation of phosphoric acid in which phosphate rock is digested with sulfuric acid to produce phosphoric acid and calcium sulfate, the improvement comprising reacting an alkali metal sulfate with fluosilicic acid to produce sulfuric acid and alkali metal silicofluoride, recycling said sulfuric acid to said digestion step, calcining said alkali metal silicofluoride with silicon oxide to produce alkali metal silicate and silicon tetrafluoride, calcining said alkali metal silicate with said calcium sulfate from said digestion step to produce said alkali metal sulfate and calcium silicate, adding water to said silicon tetrafluoride to produce fluosilicic acid, and recycling said alkali metal sulfate and fluosilicic acid to said reaction step for producing said sulfuric acid.

2. The process of claim 1 in which the alkali metal sulfate is selected from the group consisting of potassium and sodium sulfate.

3. The process of claim 1 in which an excess of silicon oxide is added to said silicofluoride.

4. The process of claim 1 in which the calcining steps are at temperatures of about 1600–2200° F.

5. The process of claim 1 in which said heating of the silicofluoride is carried out in the absence of $H_2O$, $CO_2$ and $N_2$.

6. In a process for the preparation of phosphoric acid in which phosphate rock is digested with sulfuric acid to produce phosphoric acid and calcium sulfate, the improvement comprising reacting an alkali metal surface with fluosilicic acid to produce sulfuric acid and alkali metal silicofluoride, recycling said sulfuric acid to said digestion step, calcining said alkali metal silicofluoride with silicon oxide and said calcium sulfate to produce said alkali metal sulfate, calcium silicate and silicon tetrafluoride, adding water to said silicon tetrafluoride to produce fluosilicic acid, and recycling said alkali metal sulfate and fluosilicic acid to said reaction step for producing said sulfuric acid.

7. The process of claim 6 in which said metal is potassium or sodium.

8. The process of claim 6 in which said calcining is at a temperature of about 1600–2200° F.

9. In a process for the preparation of phosphoric acid in which phosphate rock is digested with sulfuric acid to produce phosphoric acid and calcium sulfate, the improvement comprising reacting potassium sulfate with fluosilicic acid to produce sulfuric acid and potassium silicofluoride, recycling said sulfuric acid to said digestion step, adding silicon oxide to said potassium silicofluoride and heating the same to form silicon tetrafluoride and potassium silicate, mixing said potassium silicate with calcium sulfate from said digestion step and heating the mixture to form potassium sulfate and calcium silicate, recycling said potassium sulfate and calcium silicate, recycling said potassium sulfate for reuse, mixing said silicon tetrafluoride with water to form fluosilicic acid, and recycling said fluosilicic acid for reuse.

10. In a process for the preparation of phosphoric acid in which phosphate rock is digested with sulfuric acid to produce phosphoric acid and calcium sulfate, the improvement comprising reacting equimolar amounts of an alkali metal sulfate with fluosilicic acid to produce sulfuric acid and alkali metal silicofluoride, recycling said sulfuric acid to said digestion step, calcining said alkali metal silicofluoride with an excess of silicon oxide to produce alkali metal silicate and silicon tetrafluoride, calcining said alkali metal silicate with an equimolar amount of said calcium sulfate from said digestion step to produce said alkali metal sulfate and calcium silicate, adding water to said silicon tetrafluoride to produce fluosilicic acid, and recycling said alkali metal sulfate and fluosilicic acid to said reaction step for producing said sulfuric acid.

References Cited
UNITED STATES PATENTS

| 997,086 | 7/1911 | Peacock | 23—165A |
| 3,488,702 | 1/1970 | Giraitis et al. | 23—110 |

EARL C. THOMAS, Primary Examiner

H. S. MILLER, Assistant Examiner